Patented July 3, 1928.

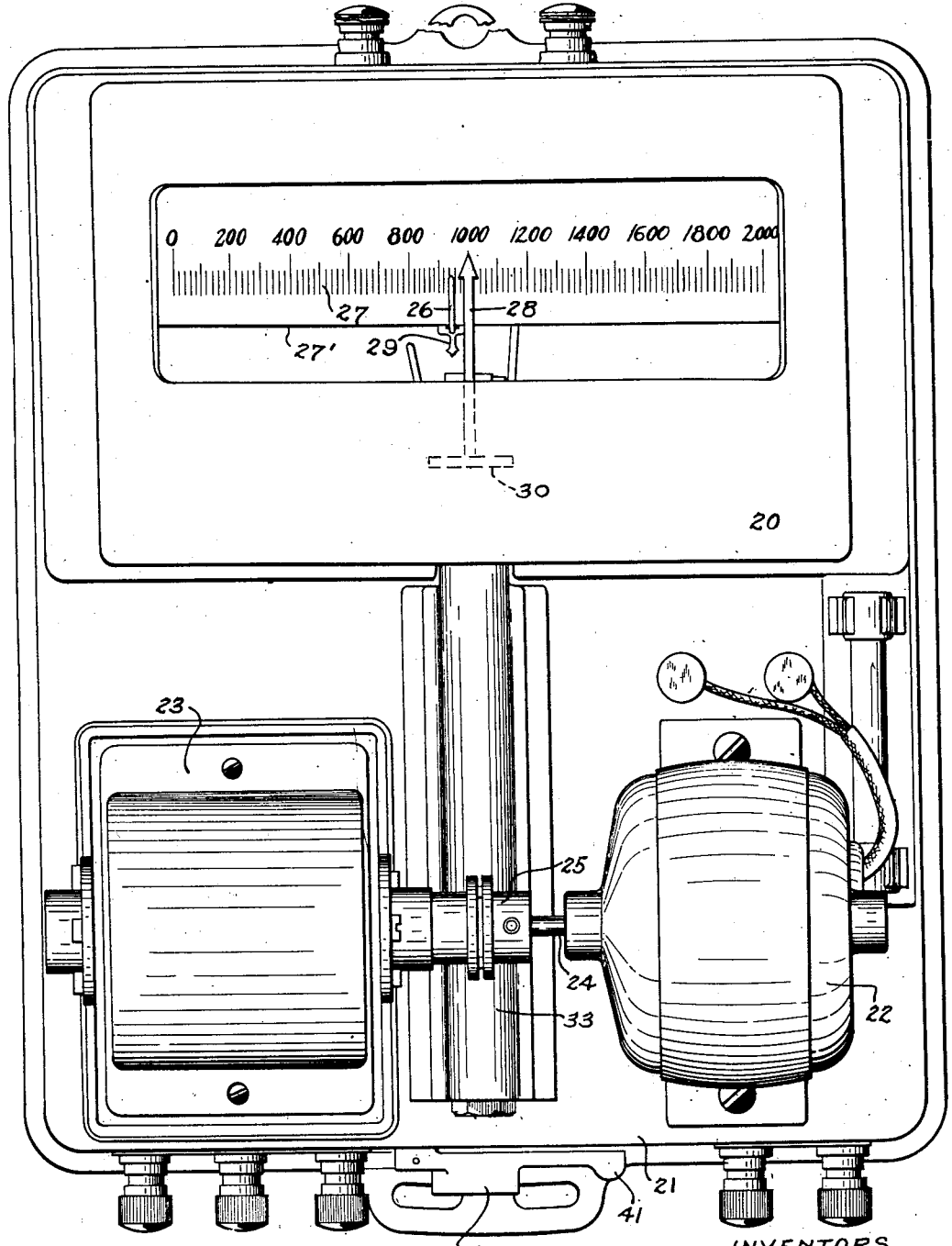

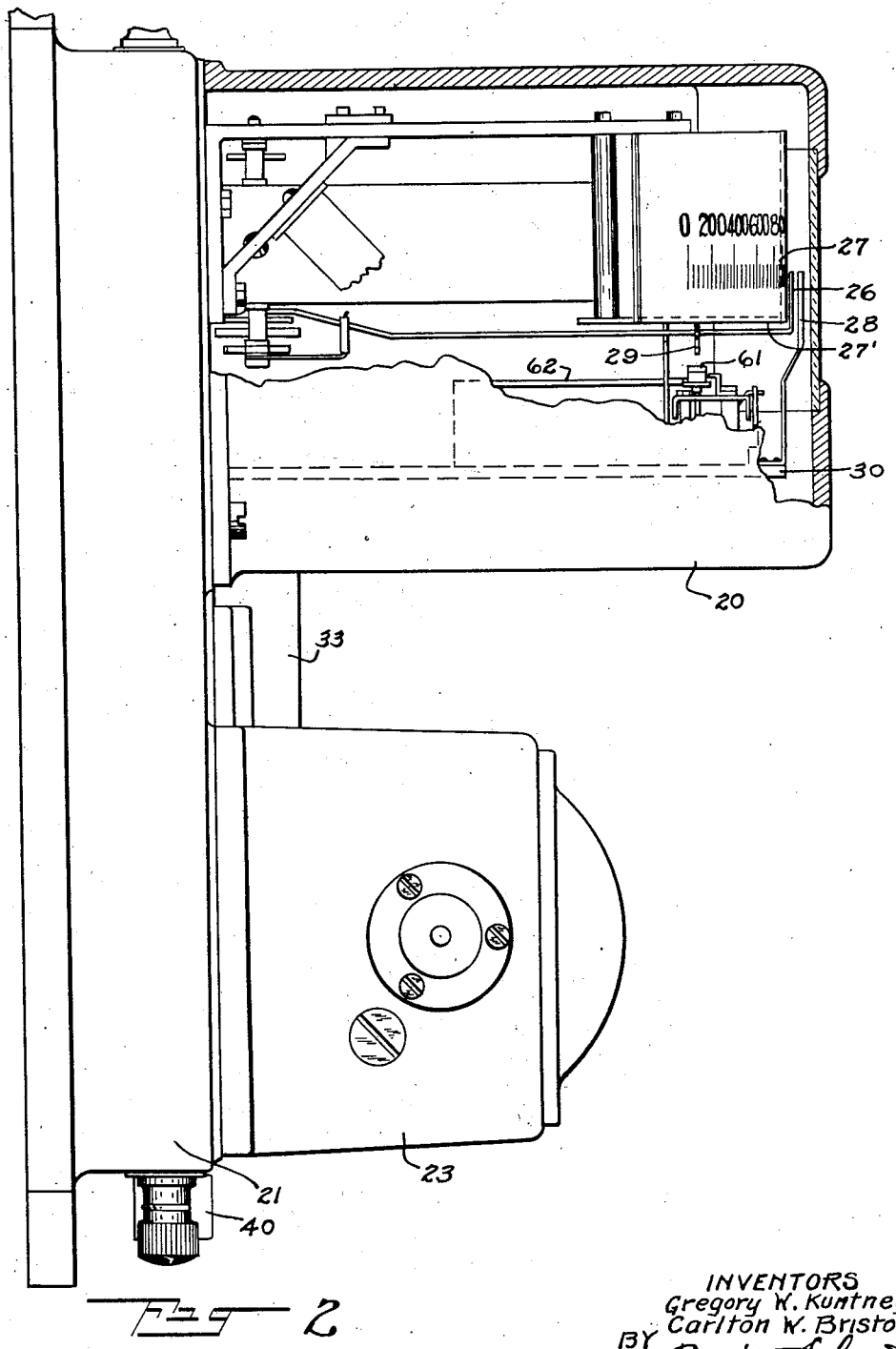

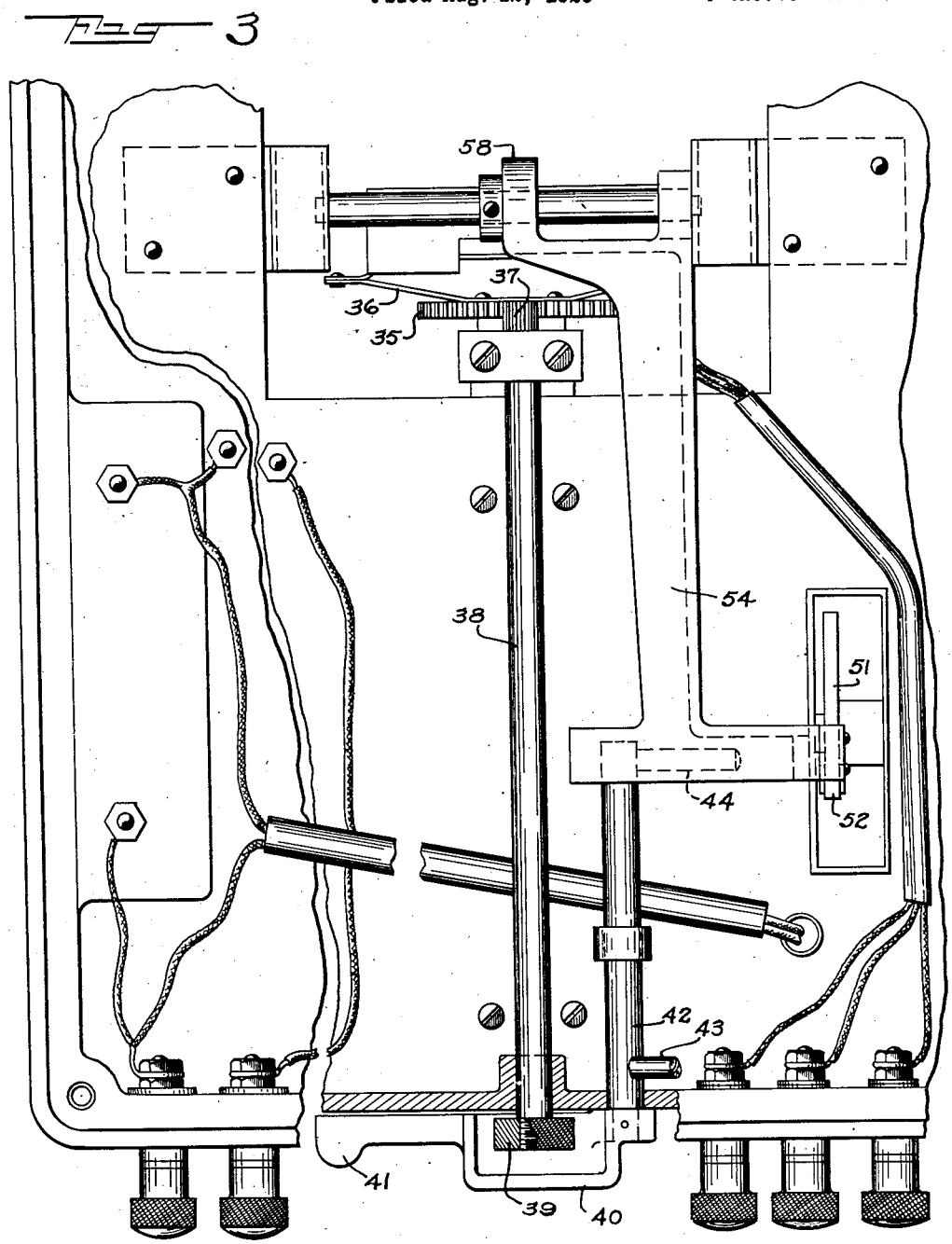

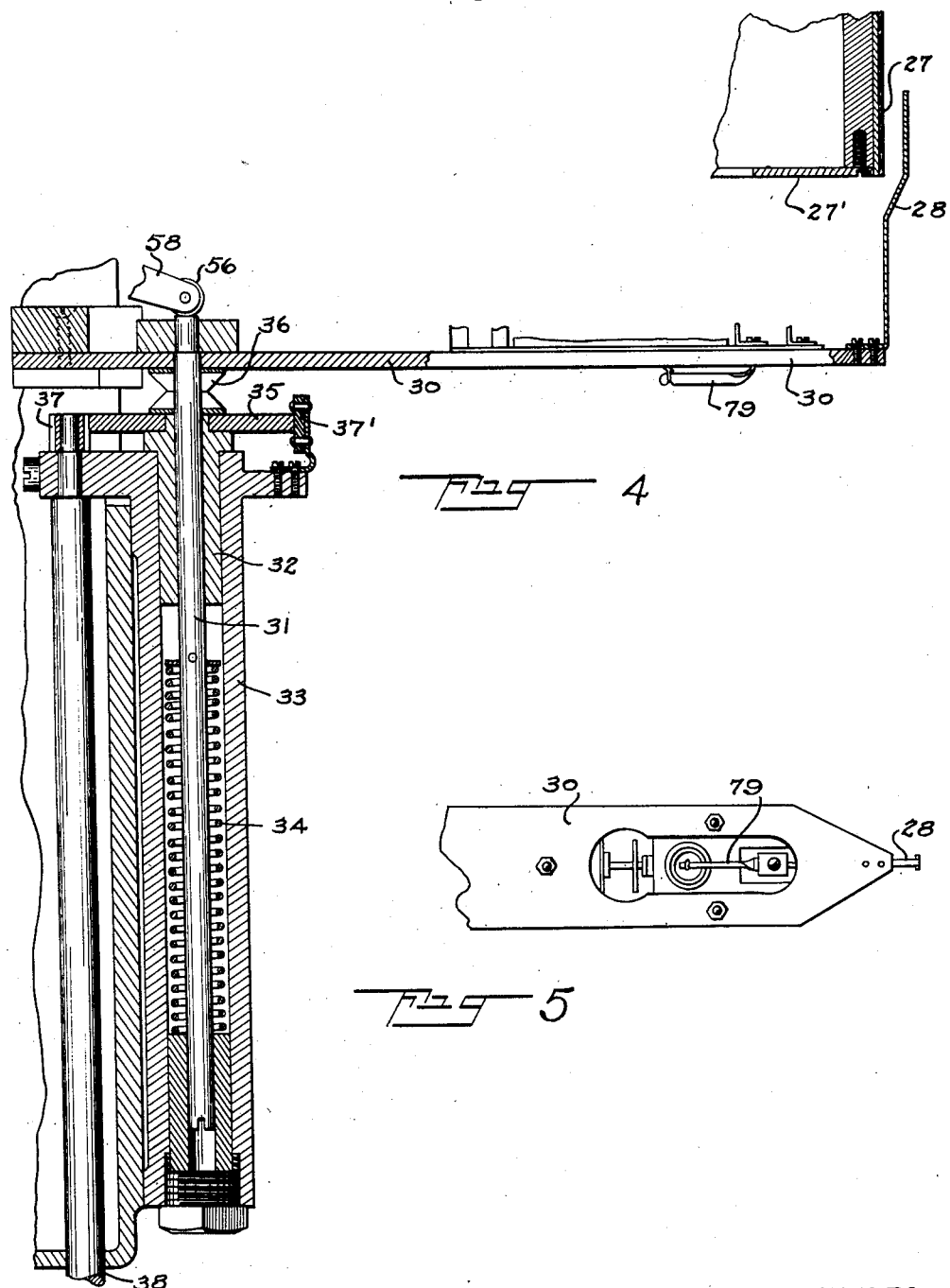

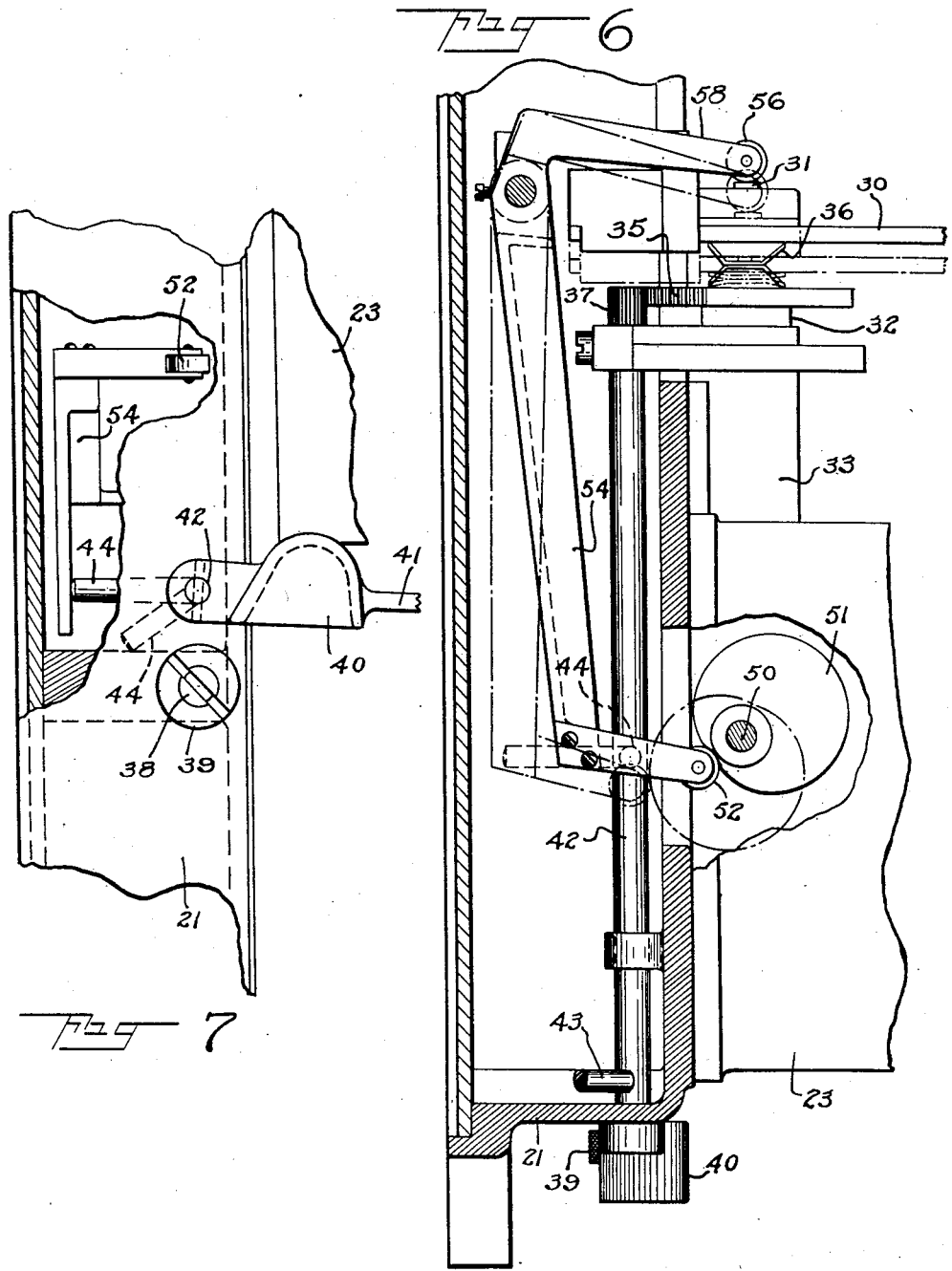

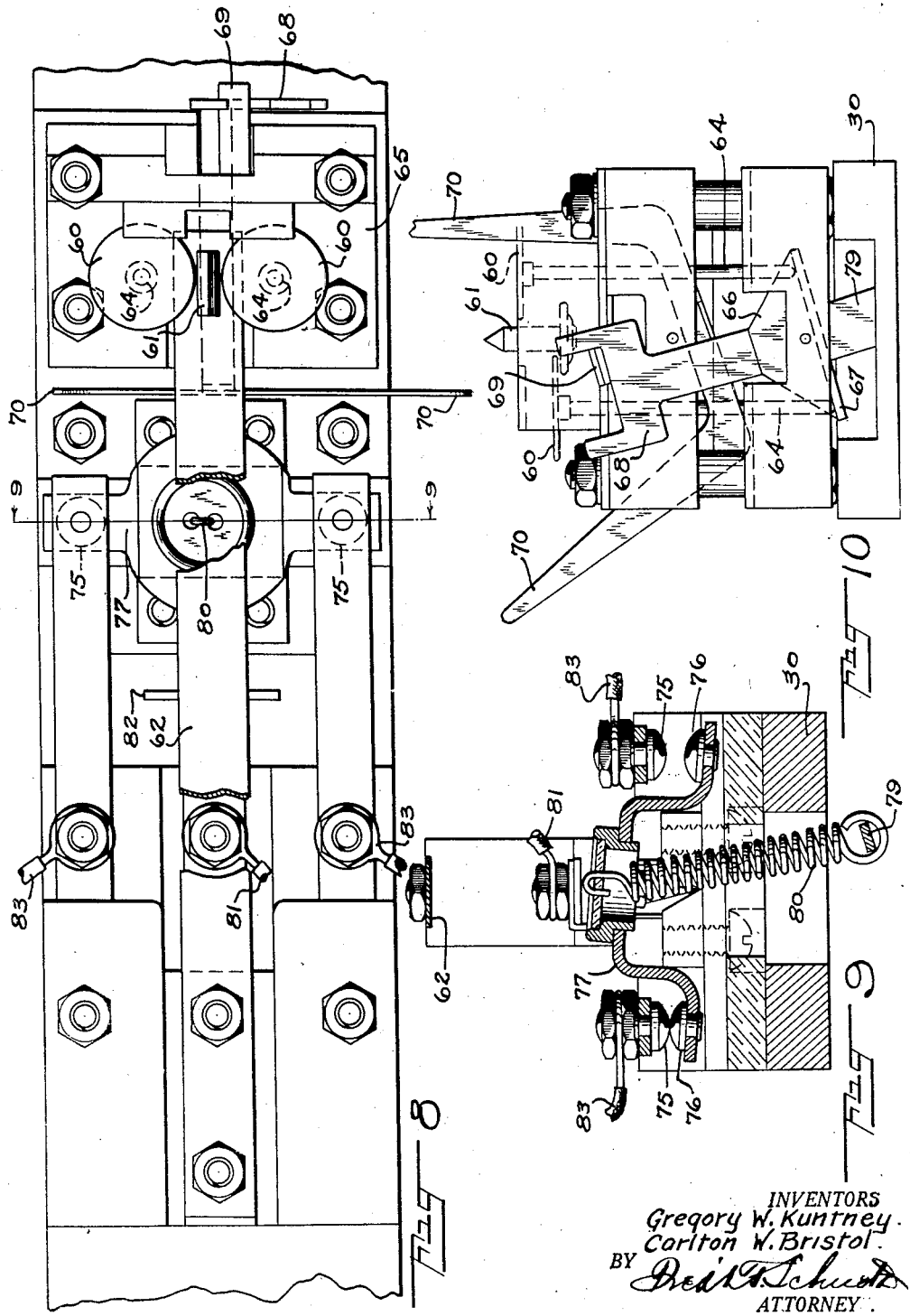

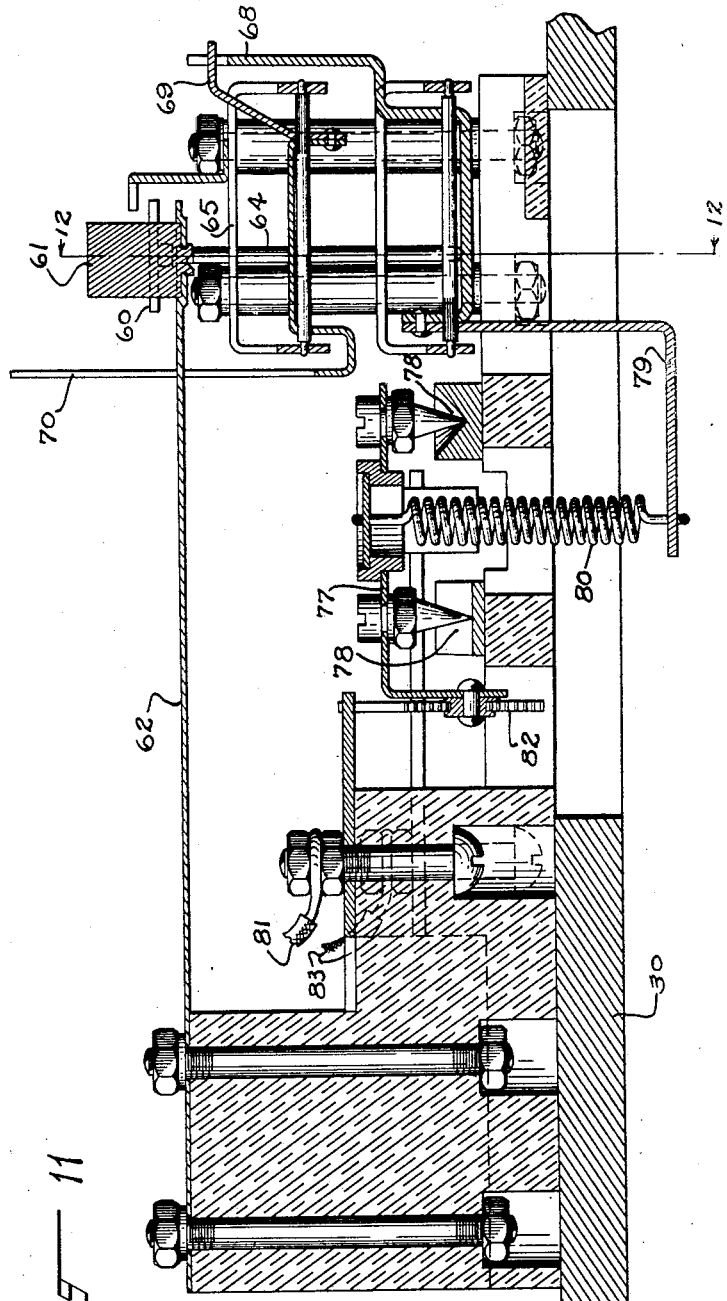

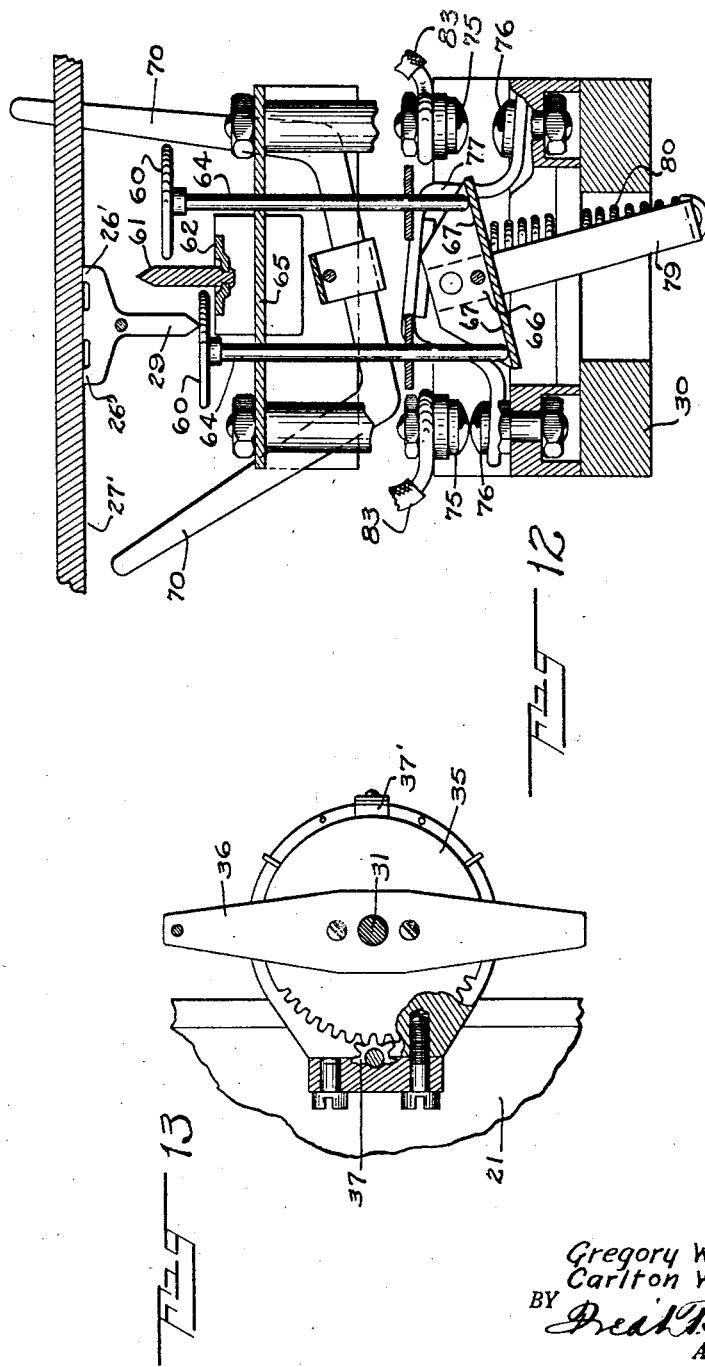

1,675,359

UNITED STATES PATENT OFFICE.

GREGORY W. KUNTNEY, OF WATERBURY, AND CARLTON W. BRISTOL, OF NAUGATUCK, CONNECTICUT, ASSIGNORS TO THE BRISTOL COMPANY, OF WATERBURY, CONNECTICUT, A CORPORATION OF CONNECTICUT.

REGULATING APPARATUS.

Application filed August 12, 1926. Serial No. 128,890.

The invention relates to automatic regulating apparatus, and more particularly to contact making means for electric circuits and controlled through the instrumentality of certain external conditions which in turn may be controlled through the action of said contact means. Or, said contact means may be caused to control other conditions or mechanism.

Apparatus of this general type is set forth in U. S. Letters Patent No. 1,203,230, and the present invention has for its object improved constructional features whereby more certain operation of the contact mechanism is insured. A further object of the invention is to more surely maintain the sensitiveness of the measuring or indicating pointer and to lessen the wear and tear thereon, the movement of said pointer being controlled by some external condition. Provision is also made for limiting the pressure between the indicating pointer and the contact making mechanism when the same are coacting to make or break a circuit. Moreover, the arrangement is such that only very slight movement is imparted thereby to the pointer in a direction at right angles to its normal angular measuring movement.

A still further object of the invention resides in the novel switch mechanism which operates with a snap action both in making and breaking of contact; in the means for imparting a straight line movement to said contact making mechanism; also in the arrangement whereby strain on the pivots of the pointer is relieved during the latter's period of contact with the contact making mechanism; in the provision of a safety lever for disengaging the contact making mechanism and pointer before moving said contact making mechanism in setting the same to a new position; and in the particular details of the means for setting the apparatus to respond to variations of conditions which initiate operation of the switch mechanism.

To this end, the invention comprises the novel construction hereinafter more fully set forth, and shown in the accompanying drawings, in which:

Figure 1 is a front elevation of the regulating apparatus.

Figure 2 is a side elevation thereof with a portion of the enclosing casing broken away to disclose the interior.

Figure 3 is a fragmentary underneath view with portions of the casing broken away.

Figure 4 is a detail fragmentary vertical section of the setting lever and adjusting mechanism therefor.

Figure 5 is a fragmentary underneath view of the setting arm on an enlarged scale.

Figure 6 is a fragmentary detail sectional view of the control mechanism for the contact making mechanism.

Figure 7 is a fragmentary underneath view, with portions of casing broken away, illustrating the guard cap and locking means for the control mechanism for the contact making mechanism.

Figure 8 is a fragmentary plan view of the contact making mechanism.

Figure 9 is a transverse vertical section taken on the line 9—9, Figure 8, and looking in the direction of the arrows.

Figure 10 is a fragmentary detail elevation of the contact making mechanism.

Figure 11 is a detail longitudinal section through the contact making mechanism.

Figure 12 is a transverse section taken on the line 12—12, Figure 11, and looking in the direction of the arrows.

Figure 13 is a fragmentary detail view, partly in section, of the setting mechanism.

Referring to the drawings, 20 designates the instrument casing which is mounted upon a base 21 carrying also below the casing 20 an operating motor 22 and transmission mechanism 23, the shaft 24 of the motor being connected to the transmission mechanism through a coupling 25. The said transmission mechanism, as will hereinafter be more fully set forth, serves periodically to actuate the novel contact making means. The latter is associated with a measuring pointer 26 which is adapted to move in the usual manner, and as is well understood, over a graduated scale 27 fixedly attached to the base 21 and having an inturned arcuate wall portion 27'. Pointer 26 is operated by any of the well known movements or means for measuring temperatures, pressure, motion and the like; and the mechanism employed for effecting movement of said pointer forms no part of the present invention, which relates more particularly to the contact making mechanism associated with the pointer and in the control by the latter of the former through the positioning of the said contact making means, as hereinafter more fully set forth. A setting pointer 28 is also associated with the scale 27, being located in proximity thereto and in front of the pointer 26 so that the one may be moved relatively to the other. The purpose of this setting pointer is to variously position the contact making mechanism hereinafter set forth to different locations corresponding to the conditions desired and which will be indicated by the particular position of said pointer 28 relative to the scale 27. It will be understood, of course, that no movement is thereby imparted to the measuring pointer 26 which is independently actuated as hereinbefore set forth.

The said measuring pointer 26 is bent substantially at right angles and extends inwardly toward the base 21 and has depending therefrom a pointed member or control element 29, the point of which is adapted to engage with a portion of the contact mechanism when brought into juxtaposition therewith under the influence of external conditions. When said contact making mechanism is then elevated to engage with said contact element 29, the said mechanism is actuated to move a switch accordingly to close or to open a corresponding circuit for restoring the desired external condition. For example, when the apparatus is employed in connection with the automatic regulation of the temperature of a gas-fired furnace, contact making mechanism would be used to control the circuits for suitable gas and air supply valves, the pointer 26 then being under control of suitable temperature responsive mechanism (not shown) and to be located at the furnace. A gradual rise of temperature by the latter would thus effect a movement of the pointer 26—the actual temperature being indicated by its position relatively to the scale 27—toward the position to which the setting pointer 28 had been adjusted and which position would correspond to the particular temperature to which the furnace is to be held. As soon as the pointer 26 passes the position corresponding to this temperature and to which the setting pointer 28 has been adjusted, the contact making mechanism will be effective, when elevated, to close through its switching mechanism a circuit for cutting off or reducing the supply of gas. The movement of pointer 26 will then be reversed due to the cooling of the furnace and will again engage the contact making mechanism in a position for operating its switch mechanism to close the circuit which will restore the mechanism for supply of fuel.

Pointer 26, moreover, is provided at the element 29 with a bracket or pair of opposite laterally extending feet 26′, which may be integral with said element as a single stamping, and said feet are adapted to ride over the arcuate wall 27′ to steady the said pointer, especially during its period of engagement with the contact making mechanism, wall 27′ acting then as an abutment and relieving the delicate mounting of same of undue stress.

The contact making mechanism, hereinafter more fully set forth, is carried by an arm 30 of the setting pointer 28, the arm being suitably counterweighted and mounted both for oscillation about an axis parallel to the pointer 28 and for bodily reciprocation in the direction of said axis of oscillation. To this end, the arm 30 is carried by a rod 31 mounted for reciprocation within a bearing 32 extending within a tubular member 33, which tube contains also a coil spring 34 tending normally to force the rod 31 upwardly. Arm 30 is movable with said rod and there is interposed between same and said bushing 32, or rather a mutilated gear 35, a leaf spring 36 tending normally to move said arm upwardly and affording a flexible coupling between the said gear and arm—allowing relative vertical movement but not relative angular movement therebetween. The contact making mechanism carried on arm 30 is moved thereby into juxtaposition with the pointer element 29 being controlled as hereinafter set forth. The gear wheel 35 meshes with a pinion 37 and whereby angular movement may be communicated to the arm and through the same to its said pointer 28 to set the latter to any desired position. A brake member 37′ may be provided to bear on the gear 35 in order to prevent too free action in adjustment. The pinion 37 is carried at the inner end of a rotatably mounted rod 38 which extends also beyond the base 21 and is provided at the outer end with a knurled head 39 whereby said rod may be conveniently turned in setting the pointer. A guard casing 40 normally encloses the top and sides of said head 39 and has an extending finger-piece 41 for manipulating the guard casing when access to the head 39 is desired. The said casing 40, in turn, is fixedly secured to the outer end of a rock shaft 42 which is oscillated by moving said casing; and the said shaft carries a stop pin 43 for limiting the movement of said guard casing as well as a pin 44 for locking the reciprocating movement normally periodically imparted to arm 30, as will hereinafter be more fully set forth. In this manner, it is possible to insure against setting of the pointer 28 during the period of reciprocation of arm 30, and which might cause serious injury both to the contact making mechanism and the movement for pointer 26 as well as the delicate pointer itself.

The reciprocating motion for arm 30 and contact making mechanism carried thereby is obtained from the motor 22 through suitable intermediate mechanism, including a shaft 50 carrying a cam 51. The latter is designed to engage a cam roller 52 at the end of the upstanding extension of the arm 54 of a bell crank lever whose other arm 58 carries a roller 56 in contact with the outer end of rod 31. Normally, arm 54 is held inwardly and thereby forces downwardly the rod 31 in opposition to spring 34, as indicated by the dotted line position, Figure 6 of the drawings; and is thus displaced a predetermined distance from the end of rod 31, the distance being determined by the design of the cam 51 which is constructed to suit the required degree of vertical movement of the contact making mechanism. When the upper end of rod 31 is thus relieved in its contact with the roller 56, said rod is free to move outwardly and will permit arm 30 to follow under the influence of the coil spring 34 and to some extent the leaf spring 36. As soon as roller 52 rides again on the high part of the cam 51, roller 56 is brought inwardly thereby and returns rod 31 and the arm 30 to their normal positions in which the contact making mechanism is out of engagement with the pointer element 29. The upward motion of the said contact making mechanism is thus derived from the spring 34, assisted slightly by the spring 36, and is of moderate and limited power. The very considerable power of the motor 22 cannot be imparted thereto, it will be noted, and which would cause damage in case the contact making portion was not most accurately adjusted relatively to the pointer.

It will be apparent, also, that serious injury might result to the delicate movement of the pointer 26 as well as to the pointer itself and to the contact making mechanism if adjustment of the setting pointer 28 were permitted during this period of reciprocation of the arm 30 with the contact making mechanism; and to this end the locking pin 44 is provided and is so arranged that it will be directed over the arm 54 of the bell crank when the guard casing 40 is raised to allow access to the head 39, as is more clearly indicated in Figures 6 and 7 of the drawings. When the pin 44 is thus in locking position, arm 54 will not be able to move upwardly even though the cam 51 may have assumed the position indicated in Figure 6 and in which the roller 52 would normally contact with the flat of said cam. Thus rod 31 will continue to be held inwardly by the roller 56 and until the guard casing 40 is returned to the position in which the head 39 will no longer be accessible for adjustment purposes.

The contact making means is shown more particularly in Figures 8 to 12 of the drawings and is actuated from the pointer 26 or rather element 29 extending therefrom, the same being adapted to depress one or the other of the pair of vertically movable members or anvils 60. These anvils are located upon opposite sides of a V-shaped piece or guiding member 61, serving to guide or deflect the pointed member 29 toward one or the other of the said anvils. The surfaces of the latter are of appreciable area so that as the member 29 is deflected or positioned to one side of the other of the guiding member 61, it will engage the corresponding elevated anvil to depress the same and associated parts when the contact making mechanism as a whole is elevated toward the pointer 26. The V-shaped guide piece 61 is carried preferably by a yielding strip 62 of spring metal or the like, in order that should the pin for any reason strike the "dead center" of the said guide piece no undue force will be applied to the sensitive pointer 26 carrying the same. The extent of upward motion of the yielding strip 62 is limited, however, by contact of the same with the under surface of one or the other of the anvils 60 which may be in its lowermost position.

The anvil members 60 have extensions or rods 64 which are guided in the frame 65 of the contact making mechanism for vertical movement; and their inner ends are adapted to engage a rocking member 66 having radially extending arms 67 disposed thereon. The arms 67 are diametrically disposed with respect to each other and beneath the respective ends of the rods 64 so that as the end of one or the other of said rods engages a respective arm of the rocking member 66, the latter will be correspondingly tilted to the particular side at which the engagement occurs. The rocking member 66 carries also an upwardly directed fork member 68 between the tines of which extends a projection 69 of an oscillating member having two upwardly extending arms or guard members 70 located upon opposite sides of the anvils 60 and adapted when in one position to permit the pointer 26 to clear the same and in the other to prevent the same passing by. The pointer will thus be held sufficiently long, between periods of reciprocation of the contact making mechanism, within the area of action of the anvils to insure contact of its element 29 with one or the other of said anvils when the said mechanism is elevated through the action of cam 51, as hereinbefore set forth. It will be understood that the positioning of the guard arms 70 is such that the higher one will be located so as to correspond with the descending or ascending movement, as the case may be, of the pointer. That is to say, that if an anvil member 60 had been depressed to turn on the gas supply, for example, the arm 70 of the opposite anvil would thereby have been raised and thus prevent the pointer from deflecting upwardly, with temperature increases of the furnace, beyond the field of action before the next elevation of the contact making mechanism.

The control of the gas supply or other instrumentalities is effected electrically through a switch comprising two sets of contacts 75 including separable members one of which, as the member 76, being movable. To this end, the same are carried by the oppositely disposed arms of the oscillating member 77 which for this purpose is pivotally mounted as on the knife edge and point bearings 78. Movement for rocking member 77 is derived from the rocking member 66 through a downwardly and inwardly directed arm 79 whose free end is connected to one end of a spring 80. The other end of this spring is attached to the member 77; and as the arm 79 is rocked from one side to the other of its neutral position, the contacts 76 are shifted accordingly and with a snap make and break action, thus diminishing the tendency to arc at the contacts. One of each of the sets of contacts, as the movable member 76, may be connected to a common lead 81 through a spring connection 82, while the remaining stationary ones are then connected to leads 83 whereby the controlling devices (not shown) are actuated upon the opening and closing of the respective sets of contacts as is well understood.

We claim:

1. Regulating apparatus, comprising contact making mechanism including a two-arm and movable electrical switch and two contacts therefor, one arm of the switch being adapted to engage a corresponding contact when the other is disengaged from its corresponding contact and vice versa; a scale plate; a measuring pointer movable thereover, associated with said switch and controlled by an external condition; and means to move periodically in a straight line said contact making mechanism as a whole and into proximity with said measuring pointer for engagement therewith to actuate thereby the said electrical switch.

2. Regulating apparatus, comprising contact making mechanism including a two-arm and movable electrical switch and two contacts therefor, one arm of the switch being adapted to engage a corresponding contact when the other is disengaged from its corresponding contact and vice versa; a scale plate; a measuring pointer movable thereover, associated with said switch and controlled by an external condition; and means to move periodically said contact making mechanism as a whole into proximity with said measuring pointer for engagement therewith and to actuate thereby the said electrical switch, said means including a continuously rotating motor, a cam driven thereby, and intermediate mechanism engaged by the cam.

3. Regulating apparatus, comprising contact making mechanism including a two-arm and movable electrical switch and two contacts therefor, one arm of the switch being adapted to engage a corresponding contact when the other is disengaged from its corresponding contact and vice versa; a scale plate; a measuring pointer movable thereover, associated with said switch and controlled by an external condition; means to move periodically said contact making mechanism as a whole into proximity with said measuring pointer for engagement therewith and to actuate thereby the said electrical switch; a setting pointer movable with the contact making mechanism; and means to set the pointer relatively to the scale plate and including a manually rotatable head.

4. Regulating apparatus, comprising contact making mechanism including a two-arm and movable electrical switch and two contacts therefor, one arm of the switch being adapted to engage a corresponding contact and vice versa; a scale plate; a measuring pointer movable thereover, associated with said switch and controlled by an external condition; means to move periodically said contact making mechanism as a whole into proximity with said measuring pointer for engagement therewith and to actuate thereby the said electrical switch; a setting pointer movable with the contact making mechanism; means to set the pointer relatively to the scale plate and including a manually rotatable head; a pivotally mounted guard member about said head to prevent access thereto; and means for locking the said moving means for the contact making mechanism when the guard member is lifted to uncover the head for allowing access thereto in positioning the setting pointer.

5. Regulating apparatus, comprising a scale plate and a measuring pointer movable thereover; contact making mechanism including a two-arm and movable electrical switch and two contacts therefor, one arm of the switch being adapted to engage a corresponding contact when the other arm is disengaged from its corresponding contact and vice versa; an arm member carrying said contact making mechanism; a slidably mounted rod supporting the same and spring-urged toward the measuring pointer; and means to hold said rod normally away from the measuring pointer.

6. Regulating apparatus, comprising a scale plate and a measuring pointer movable thereover; contact making mechanism including a two arm and movable electrical switch and two contacts therefor, one arm of the switch being adapted to engage a corresponding contact when the other arm is disengaged from its corresponding contact and vice versa; an arm member carrying said contact making mechanism; a slidably mounted rod supporting the same and spring-urged toward the measuring pointer; means to hold said rod normally away from the measuring pointer; means to angularly move said arm on said rod including a mutilated gear and a pinion engaging the same, and a leaf spring connecting the mutilated gear and arm, constraining the latter to follow the angular movement of the former but permitting movement thereof in the direction of the axis of said rod.

7. Regulating apparatus, comprising a scale plate and a measuring pointer movable thereover; contact making mechanism including a two-arm and movable electrical switch and two contacts therefor, one arm of the switch being adapted to engage a corresponding contact when the other arm is disengaged from its corresponding contact, and vice versa, a rocking member adapted to actuate the electrical switch, and a pair of movable anvil members adapted to be engaged alternately by the measuring pointer and in turn engaging the said rocking member when either anvil is depressed by engagement with the said measuring pointer.

8. Regulating apparatus, comprising a scale plate and a measuring pointer movable thereover; contact making mechanism including a two-arm and movable electrical switch and two contacts therefor, one arm of the switch being adapted to engage a corresponding contact when the other arm is disengaged from its corresponding contact, and vice versa, a rocking member adapted to actuate the electrical switch, a pair of movable anvil members adapted to be engaged alternately by the measuring pointer and in turn engaging the said rocking member when either anvil is depressed by engagement with said measuring pointer, and an intermediate beveled member for deflecting said measuring pointer to one or the other of the anvil members; and means to move periodically said contact making mechanism as a whole into proximity with said measuring pointer.

9. Regulating apparatus, comprising a scale plate and a measuring pointer movable thereover; contact making mechanism including a two-arm and movable electrical switch and two contacts therefor, one arm of the switch being adapted to engage a corresponding contact when the other arm is disengaged from its corresponding contact, and vice versa, a rocking member adapted to actuate the electrical switch, a pair of movable anvil members adapted to be engaged alternately by the measuring pointer and in turn engaging the said rocking member when either anvil is depressed by engagement with said measuring pointer, and an intermediate flexible and beveled member deflecting the measuring pointer to one or the other of the anvil members and adapted for engagement with the undersurface of a said anvil member when the latter is in its depressed position; and means to move periodically said contact making mechanism as a whole into proximity with said measuring pointer.

10. Regulating apparatus, comprising a scale plate and a measuring pointer movable thereover, contact making mechanism including a two-arm and movable electrical switch and two contacts therefor, one arm of the switch being adapted to engage a corresponding contact when the other arm is disengaged from its corresponding contact, and vice versa, a rocking member adapted to actuate the electrical switch, a pair of movable anvil members adapted to be engaged alternately by the measuring pointer and in turn engaging the said rocking member when either anvil is depressed by engagement with said measuring pointer, and a pair of fingers extending from said rocking member upon either side of the measuring pointer, one finger permitting the measuring pointer to travel beyond it when the corresponding anvil has been depressed and the other then stopping movement of the measuring pointer beyond it; and means to move periodically said contact making mechanism as a whole into proximity with said measuring pointer.

11. A regulating apparatus, comprising contact making mechanism including a two-arm and movable electrical switch and two contacts therefor, one arm of the switch being adapted to engage a corresponding contact when the other is disengaged from its corresponding contact, and vice versa; a scale plate; a measuring pointer movable thereover and provided with an extension adapted to contact with a fixed portion of the apparatus to afford an abutment when the contact making mechanism is brought into engagement therewith; and means to move periodically said contact making mechanism as a whole into proximity with said measuring pointer for engagement therewith and to actuate thereby the said electrical switch.

12. A regulating apparatus, comprising contact making mechanism including a two-arm and movable electrical switch and two contacts therefor, one arm of the switch being adapted to engage a corresponding contact when the other is disengaged from its corresponding contact, and vice versa; a scale plate; a measuring pointer movable thereover and provided with an extension adapted to contact with a fixed portion of the apparatus to afford an abutment when the contact making mechanism is brought into engagement therewith, said measuring pointer having a further extension in an opposite direction for engagement with the contact making mechanism; and means to move periodically said contact making mechanism as a whole into proximity with said measuring pointer for engagement therewith and to actuate thereby the said electrical switch.

In testimony whereof we affix our signatures.

GREGORY W. KUNTNEY.
CARLTON W. BRISTOL.